(No Model.)
J. DALZELL.
GLASSWARE.
No. 305,674. Patented Sept. 23, 1884.
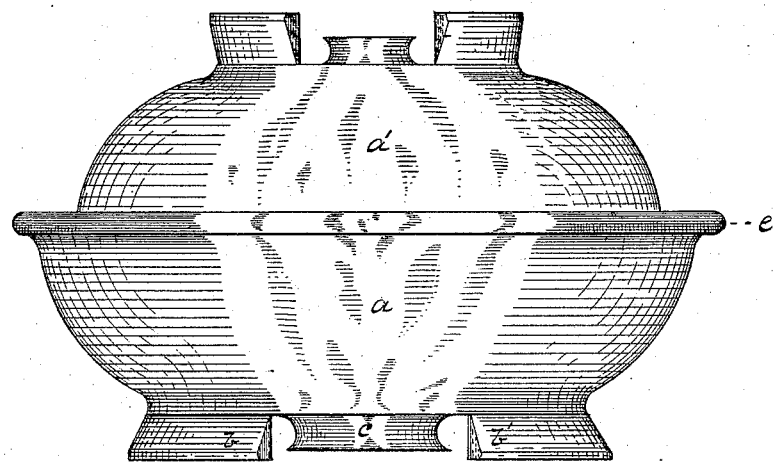
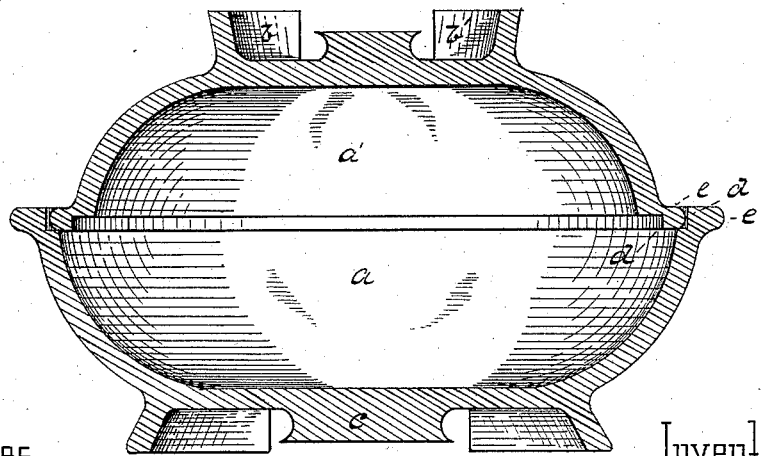

UNITED STATES PATENT OFFICE.

JAMES DALZELL, OF WELLSBURG, WEST VIRGINIA.

GLASSWARE.

SPECIFICATION forming part of Letters Patent No. 305,674, dated September 23, 1884.

Application filed April 11, 1884. (No model.)

*To all whom it may concern:*

Be it known that I, JAMES DALZELL, of Wellsburg, in the county of Brooke and State of West Virginia, have invented a new and useful Improvement in Glassware; and I do hereby declare the following to be a full, clear, and exact description thereof, reference being had to the accompanying drawings, in which—

Figure 1 is a side elevation of my improved dish. Fig. 2 is a vertical sectional view of the same.

Like letters of reference indicate like parts wherever they occur.

My invention consists in forming articles of glassware—such as the dishes shown in the drawings—so that a dish of a smaller size may be employed as a cover to one of the larger size, which cover, when desired, may also be used as a dish, either with or without a corresponding cover of a smaller size.

I will now describe my invention, so that others skilled in the art may manufacture the same.

In the drawings, $a$ represents the body of the dish; $a'$, the body of the dish forming the cover, which dishes are oval in form, and at the bottom of each are projecting flanges $b\ b'$, which serve as supports or feet for the dish. Projecting ornamented lugs may be substituted for these flanges, if desired. On the outside bottom face of the dish is an ornamented projecting lug or handle, $c$, the width or thickness of which is less than that of the flanges or feet $b\ b'$, so that when the dish is placed on a table, resting on the flanges or feet, the handle $c$ will not come in contact therewith. This foot or handle may be ornamented as desired. It will be noticed that the flanges $b\ b'$ do not extend entirely around the bottom of the dish, but are separated from each other. The purpose of this is to enable the handle $c$ to be easily formed in a hinged mold. I do not desire to limit myself, however, to this form.

In the upper edge of each dish is formed a recess, $d$, and an outer bead, $e$, which recess forms a seat for the bead on the cover, while the bead adds to the strength of this part of the dish. These dishes may be used for a variety of purposes, and may be in any form desired, as either a covered or open dish.

Although I have described my invention as applied to glassware, it is equally as well applicable to earthenware dishes.

The advantages of the invention are the cheapness in forming the dish and cover, and that if either part be broken it is easily replaced.

I am aware that it is not new to form a dish or dishes so that they can be used either as a cover or dish, and I do not therefore desire to cover the same, broadly; but,

Having thus described my invention, what I claim, and desire to secure by Letters Patent, is—

1. A dish having a projecting lug or handle formed on the lower outer face of the same and projecting lugs or feet equal to or greater in length than the handle, so that the dish may be employed as a cover for a similar dish, substantially as and for the purpose specified.

2. A dish having a projecting lug or handle on the lower outer face of the dish and a projecting flange or feet equal to or greater in length than the handle, so that the dish may be employed as a cover for a similar dish, substantially as and for the purpose specified.

In testimony whereof I have hereunto set my hand this 8th day of April, A. D. 1884.

JAMES DALZELL.

Witnesses:
W. B. CORWIN,
L. C. FITLER.